United States Patent
Huang et al.

(10) Patent No.: US 12,374,991 B2
(45) Date of Patent: Jul. 29, 2025

(54) SYSTEMS AND METHODS FOR IMPROVING RADIATED EMI IN SWITCHING POWER SUPPLIES

(71) Applicant: Navitas Semiconductor Limited, Dublin (IE)

(72) Inventors: Xiucheng Huang, Torrance, CA (US); Mingqiang Li, Shenzhen (CN); Weijing Du, Torrance, CA (US); Yun Zhou, Shenzhen (CN)

(73) Assignee: Navitas Semiconductor Limited, Dublin (IE)

( * ) Notice: Subject to any disclaimer, the term of this patent is extended or adjusted under 35 U.S.C. 154(b) by 221 days.

(21) Appl. No.: 18/305,248

(22) Filed: Apr. 21, 2023

(65) Prior Publication Data

US 2024/0079951 A1 Mar. 7, 2024

(51) Int. Cl.
*H02M 1/44* (2007.01)
*H02M 1/12* (2006.01)
*H02M 1/42* (2007.01)
*H02M 3/335* (2006.01)
*H02M 1/34* (2007.01)

(52) U.S. Cl.
CPC .............. *H02M 1/44* (2013.01); *H02M 1/126* (2013.01); *H02M 1/4208* (2013.01); *H02M 3/33571* (2021.05); *H02M 1/348* (2021.05)

(58) Field of Classification Search
CPC .......... H02M 1/32; H02M 1/34; H02M 1/346; H02M 1/348; H02M 1/44; H02M 3/335; H02M 3/33571
See application file for complete search history.

(56) References Cited

U.S. PATENT DOCUMENTS

| | | | | |
|---|---|---|---|---|
| 4,016,482 A | * | 4/1977 | Cielo | H02M 1/32 323/289 |
| 5,394,319 A | * | 2/1995 | Attwood | H02M 3/28 363/21.04 |
| 6,304,129 B1 | * | 10/2001 | Blair | H03F 3/191 327/427 |
| 9,837,917 B1 | * | 12/2017 | Furtner | H02M 3/33523 |
| 2007/0220050 A1 | * | 9/2007 | Hsu | H03H 1/0007 |
| 2016/0211656 A1 | * | 7/2016 | Chang | G06F 1/26 |
| 2018/0019686 A1 | * | 1/2018 | Ikeda | H10D 8/60 |

* cited by examiner

*Primary Examiner* — Gary L Laxton
(74) *Attorney, Agent, or Firm* — FisherBroyles, LLP

(57) ABSTRACT

Systems and methods for improving radiated electromagnetic interference (EMI) in switching power supplies are disclosed. In one aspect, a converter circuit includes a transformer having a primary winding and a secondary winding, the primary winding extending from a first primary terminal to a second primary terminal, a first switch having a first gate terminal, a first source terminal and a first drain terminal, wherein the first drain terminal is coupled to the first primary terminal, and the first source terminal is coupled to a power source, and a capacitor having a first capacitor terminal and second capacitor terminal, wherein the first capacitor terminal is coupled to the power source. A ferrite bead is coupled between the first primary terminal and the first drain terminal, and a capacitor network is coupled in parallel with the ferrite bead and arranged to reduce radiated electromagnetic interference of the converter circuit.

20 Claims, 19 Drawing Sheets

SYSTEMS AND METHODS FOR IMPROVING RADIATED EMI IN SWITCHING POWER SUPPLIES

CROSS-REFERENCE TO RELATED APPLICATIONS

The present application claims priority to Chinese Patent Application No. 202211066475.1 filed on Sep. 1, 2022, entitled "METHOD FOR IMPROVING RADIATED EMI OF SWITCHING POWER SUPPLY," the contents of which are incorporated herein by reference in their entirety for all purposes.

FIELD

The described embodiments relate generally to switching power supplies, and more particularly, the present embodiments relate to systems and methods for improving radiated electromagnetic interference (EMI) in switching power supplies.

BACKGROUND

Electronic devices such as computers, servers and televisions, among others, employ one or more electrical power conversion circuits to convert one form of electrical energy to another. Some electrical power conversion circuits use switching power supplies such as a flyback converter. Switching power supplies can efficiently convert power from a source to a load. Switching power supplies may have relatively high power conversion efficiency, as compared to other types of power converters. Switching power supplies may also be substantially smaller and lighter than a linear supply due to the smaller transformer size and weight.

SUMMARY

In some embodiments, a converter circuit is disclosed. The converter circuit includes a transformer having a primary winding and a secondary winding, the primary winding extending from a first primary terminal to a second primary terminal, a first switch having a first gate terminal, a first source terminal and a first drain terminal, where the first drain terminal is coupled to the first primary terminal and the first source terminal is coupled to a power source, a capacitor having a first capacitor terminal and second capacitor terminal, where the first capacitor terminal is coupled to the power source, a ferrite bead coupled between the first primary terminal and the first drain terminal, and a capacitor network coupled in parallel with the ferrite bead and arranged to reduce radiated electromagnetic interference of the converter circuit.

In some embodiments, the converter circuit further includes a diode having a first diode terminal and a second diode terminal, wherein the first diode terminal is coupled to the first primary terminal and the second diode terminal is coupled to the second capacitor terminal.

In some embodiments, the capacitor network includes a plurality of serially connected capacitors.

In some embodiments, the capacitor network includes a plurality of parallel connected capacitors.

In some embodiments, the ferrite bead includes a plurality of serially connected ferrite beads.

In some embodiments, the ferrite bead includes a plurality of parallel connected ferrite beads.

In some embodiments, the converter further includes a resistor network coupled in series with the capacitor network.

In some embodiments, the first switch is a gallium nitride (GaN) based switch.

In some embodiments, a method of reducing radiated electromagnetic interference in a converter circuit is disclosed. The method includes providing a transformer having a primary winding and a secondary winding, the primary winding extending from a first primary terminal to a second primary terminal, providing a first switch having a first gate terminal, a first source terminal and a first drain terminal, where the first drain terminal is coupled to the first primary terminal, and the first source terminal is coupled to a power source, providing a capacitor having a first capacitor terminal and second capacitor terminal, where the first capacitor terminal is coupled to the power source, coupling a ferrite bead coupled between the first primary terminal and the first drain terminal, and coupling a capacitor network coupled in parallel with the ferrite bead and arranged to reduce a radiated electromagnetic interference of the converter circuit.

In some embodiments, the method further includes providing a diode having a first diode terminal and a second diode terminal, wherein the first diode terminal is coupled to the first primary terminal and the second diode terminal is coupled to the second capacitor terminal.

In some embodiments, a converter circuit is disclosed. The converter circuit includes a transformer having a primary winding and a secondary winding, the primary winding extending from a first primary terminal to a second primary terminal, a first switch having a first gate terminal, a first source terminal and a first drain terminal, wherein the first drain terminal is coupled to the first primary terminal, and the first source terminal is coupled to a power source, a capacitor having a first capacitor terminal and second capacitor terminal, where the first capacitor terminal is coupled to the power source, a diode having a first diode terminal and a second diode terminal, where the first diode terminal is coupled to the first primary terminal and the second diode terminal is coupled to the second capacitor terminal, a ferrite bead coupled between the power source and the secondary winding, a Y-capacitor coupled between the ferrite bead and the power source, and a capacitor network coupled in parallel with the ferrite bead and arranged to reduce radiated electromagnetic interference of the converter circuit.

In some embodiments, the converter circuit further includes a resistor network coupled in series with the capacitor network.

BRIEF DESCRIPTION OF THE DRAWINGS

FIG. 8C shows radiated EMI spectrum for the flyback power converter of FIG. 8A without utilizing the disclosed methods, while FIG. 8D shows radiated EMI spectrum for the flyback power converter of FIG. 8A using the disclosed methods to reduce radiated EMI of the converter.

FIG. 9C shows radiated EMI spectrum for the flyback power converter of FIG. 9A without utilizing the disclosed methods, while FIG. 9D shows radiated EMI spectrum for the flyback power converter of FIG. 9A using the disclosed methods to reduce radiated EMI of the converter.

DETAILED DESCRIPTION

Figure 1A:
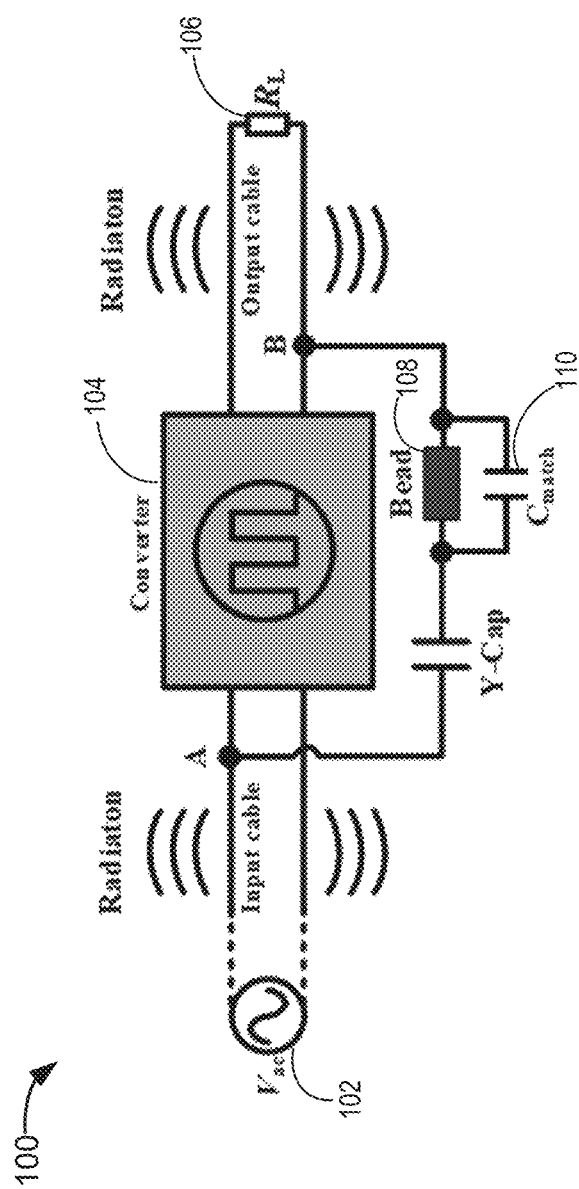
FIG. 1A illustrates a power converter with a matching capacitor connected in parallel to a ferrite bead, according to an embodiment of the disclosure.

Circuits, devices and related techniques disclosed herein relate generally to power converters. More specifically, circuits, devices and related techniques disclosed herein relate to systems and methods for improving radiated electromagnetic interference (EMI) in switching power supplies. Radiated EMI may occur when an electrical device generates a radio frequency that is picked up and causes unwanted effects in another device. In some embodiments, a reduction in the radiated EMI can be achieved by coupling capacitor networks in parallel with a ferrite bead in a switching power supply. The combination of capacitor networks and the ferrite bead can create high and/or low impedance nodes at certain frequencies that can reduce the radiated EMI. In various embodiments, a matching impedance network can be coupled to the ferrite bead in order to reduce the radiated EMI of the converter, where the impedance network can include a capacitor network and a resistor network.

In various embodiments, a matching capacitor or capacitor network may be connected in parallel to a ferrite bead to fine tune the impedance characteristics of the ferrite bead over certain frequency ranges. This can maximize the radiated EMI suppression effect of the ferrite bead. A ferrite bead is a passive device that can filter high frequency noise energy over a certain frequency range. However, readily available ferrite beads on the market may have characteristics for standard frequencies that may not be useful to reduce radiated EMI in certain applications such as relatively high-switching rate switching power supplies. In various embodiments, matching capacitor networks can be added to a ferrite bead to fine tune its EMI suppressive ability to specific frequency ranges. In this way, a switching power supply can have reduced radiated EMI and can operate within acceptable limits of EMI in an electronic system without disturbing devices adjacent to it.

In some embodiments, wide-bandgap semiconductor devices, such as, but not limited to, gallium nitride (GaN) based switches may be used in switching power supplies to increase switching frequency and power density of the power supply as compared to traditional silicon switches. However, relatively higher switching frequencies and power densities may cause the switching power supply to experience relatively high electromagnetic interference radiation. Ferrite beads that may be readily available on the market may not be capable of attenuating the increased EMI of power supplies using wide-bandgap semiconductor devices because the readily available ferrite beads may have standard high frequency characteristics that is suited for use with traditional silicon devices, thereby preventing them from adequately attenuating EMI radiation on wide-bandgap based power supplies. Methods of customizing high frequency characteristics of ferrite beads are disclosed where a capacitor network can be coupled in parallel with the ferrite bead enabling attenuation of EMI radiation in high-switching rate power supplies using wide-bandgap semiconductor devices such that wide-bandgap based power supplies can operate with acceptable EMI limits. Various inventive embodiments are described herein, including methods, processes, systems, devices, and the like.

Several illustrative embodiments will now be described with respect to the accompanying drawings, which form a part hereof. The ensuing description provides embodiment (s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1A illustrates a power converter 100 with a matching capacitor connected in parallel to a ferrite bead according to an embodiment of the disclosure. As shown in FIG. 1, an AC line input 102 can be coupled to a converter 104, that provides DC power to a load 106. A ferrite bead 108 can be connected between nodes A (primary side) and B (secondary side). A node in a circuit may also be referred to as a point. A matching capacitor 110 can be connected in parallel with the ferrite bead 108. A Y-capacitor can be connected in series with the ferrite bead, where the Y-capacitor is coupled between point A and the ferrite bead 108. Y-capacitors are safety certified and can be used in AC line filtering.

Most of the radiated EMI may be emitted from the input and the output cables. The ferrite bead 108 may act to reduce the radiated EMI over particular frequencies, however those frequencies may not be the desired frequencies where a reduction of radiated EMI is useful. In addition, the impedance characteristics of a ferrite bead are fixed, and ferrite beads with useful impedance characteristics may not be readily available that can allow the power converter 100 to operate within the acceptable EMI limits. A matching capacitor 110 can be added in parallel to the ferrite bead 108 in order to customize the EMI suppression frequencies of the ferrite bead 108. In this way, a reduction of radiated EMI can be achieved at desired frequencies and the power converter 100 is enabled to operate within acceptable EMI limits.

Figure 1B:
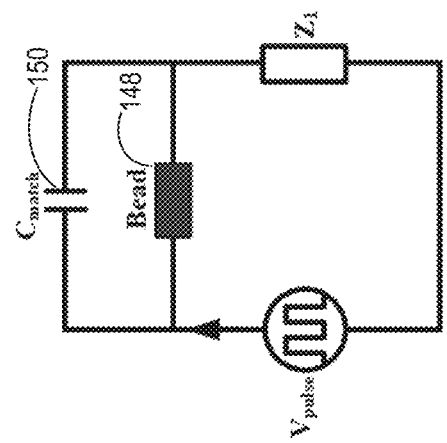
FIG. 1B illustrates a power converter circuit with a ferrite bead and its matching capacitor coupled with a switching device, according to certain embodiments.

FIG. 1B illustrates a converter circuit with a ferrite bead and its matching capacitor coupled with a switching device, according to certain embodiments. As shown, matching capacitor 150 can be connected in parallel with the ferrite bead 148 to improve the radiated EMI characteristics of the ferrite bead 148. $V_{pulse}$ is an equivalent noise source of a potential jump point and $Z_1$ is an equivalent impedance of the radiated EMI propagation path. By adding the matching capacitor 150 in parallel with the ferrite bead 148, high frequency voltage and current oscillations can be damped, thereby reducing the radiated EMI. When the ferrite bead 148 is connected to a potential jump point A, for example, the magnetic bead can be connected in series with a diode thereby limiting oscillations of high-frequency noise current.

Figure 2D:
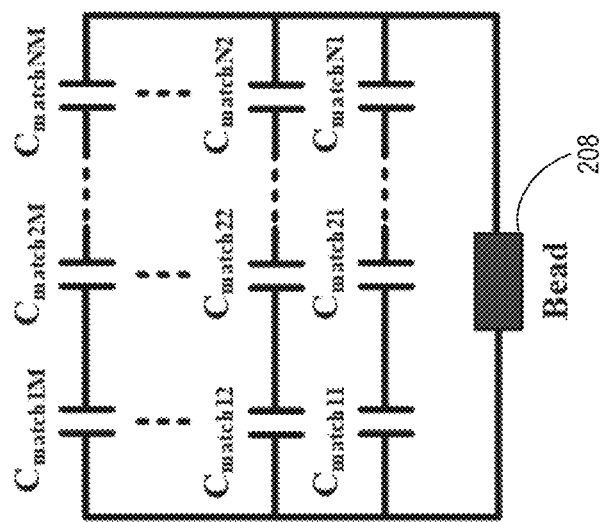
FIGS. 2A-2D illustrate various configurations for connecting a matching capacitor or a plurality of capacitors to a ferrite bead in a power converter, according to embodiments of the disclosure.
Figure 2C:
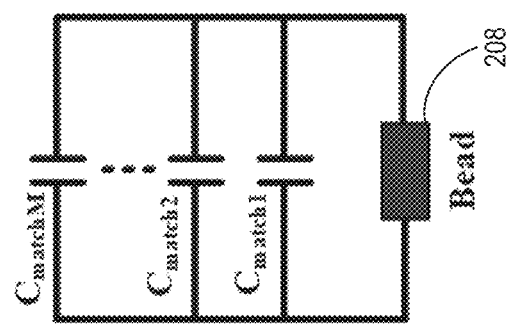
Figure 2B:
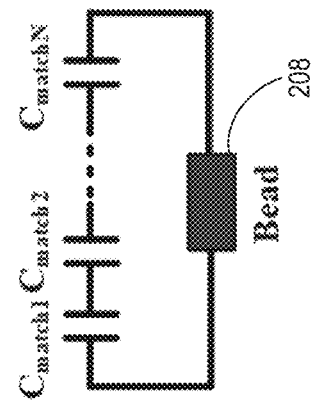
Figure 2A:
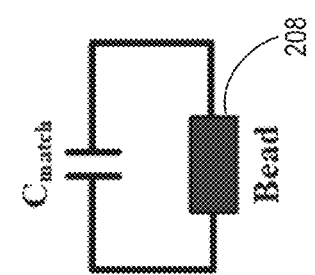

FIGS. 2A-2D illustrate various configurations for connecting a matching capacitor or a plurality of capacitors to a ferrite bead in a power converter according to embodiments of the disclosure. FIG. 2A shows a single matching capacitor connected in parallel with a ferrite bead 208. FIG. 2B shows a plurality of capacitors that are coupled in series, where the plurality of capacitors is connected in parallel with a ferrite bead 208. FIG. 2C shows a plurality of capacitors that are coupled to the ferrite bead 208 in parallel. FIG. 2D shows a plurality of serially connected capacitors that are coupled in parallel with the ferrite bead 208. The various configurations in FIGS. 2A-2D enable fine tuning of the EMI suppression frequencies of the ferrite bead 208.

Figures 3A, 3B, 3C, 3D:
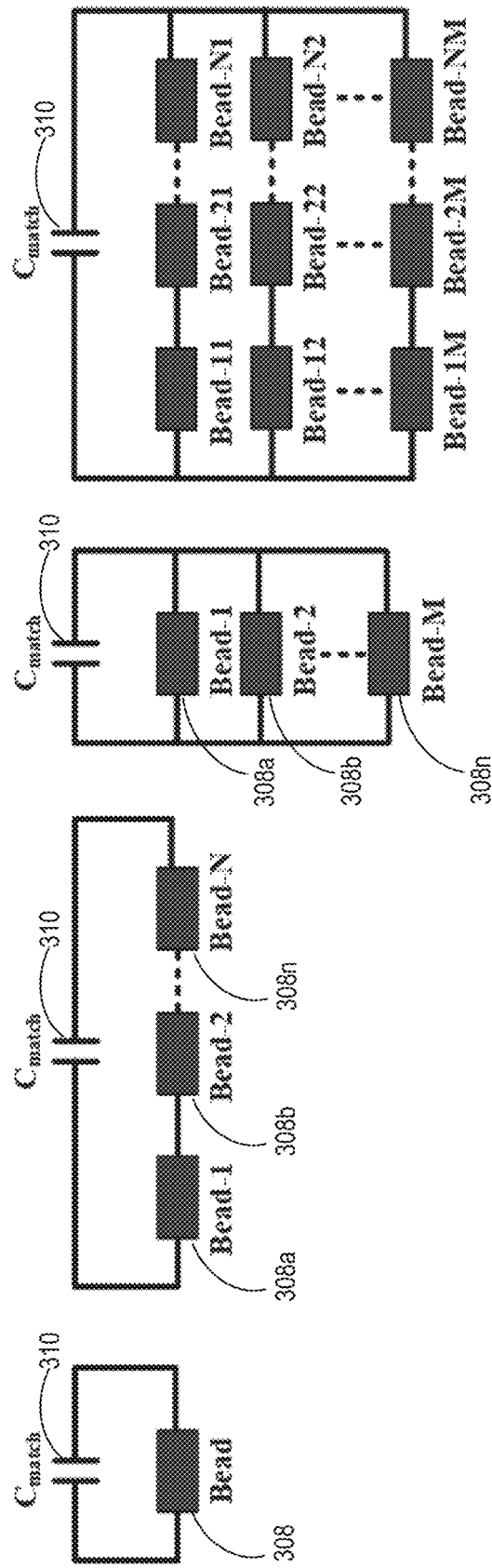
FIGS. 3A-3D illustrate various configurations for connecting a matching capacitor to a ferrite bead or plurality of ferrite beads in a power converter according to embodiments of the disclosure.

FIGS. 3A-3D illustrate various configurations for connecting a matching capacitor to a ferrite bead or plurality of ferrite beads in a power converter 100, according to certain embodiments. FIG. 3A shows a matching capacitor 310 connected in parallel with a ferrite bead 308. FIG. 3B shows a plurality of ferrite beads 308a, 308b to 308n that are coupled in series, where the plurality of ferrite bead is connected in parallel with a matching capacitor 310. FIG. 3C shows a plurality of ferrite beads 308a, 308b to 308n that are coupled to the matching capacitor 310 in parallel. FIG. 3D shows a plurality of serially connected ferrite beads that are coupled in parallel with the matching capacitor 310. The various configurations in FIGS. 3A-3D enable fine tuning of the EMI suppression frequencies of the combination of the ferrite bead(s) and the matching capacitor in the power converter 100.

Figure 4:
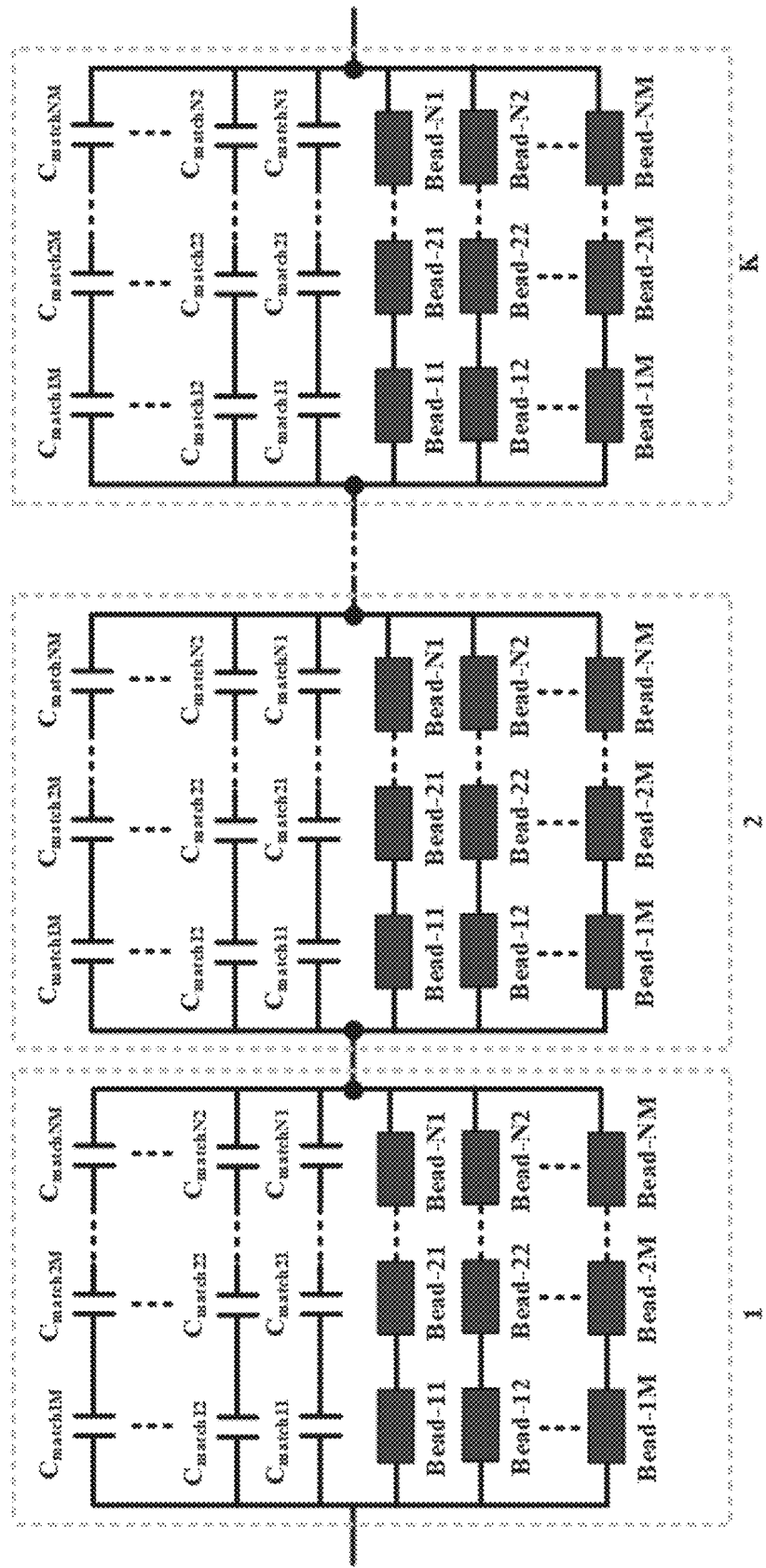
FIG. 4 illustrates various configurations for connecting matching capacitors to ferrite beads in a power converter according to embodiments of the disclosure.

FIG. 4 illustrates various configurations for connecting matching capacitors to ferrite beads in a power converter 100 according to embodiments of the disclosure. In the illustrated embodiment, the magnetic bead and the matching capacitor may have K×M×N combinations, as shown in FIG. 4. As appreciated by one of ordinary skill in the art having the benefit of this disclosure, the present disclosure can have a wide range of applications, where the magnetic bead and the matching impedance network can be connected at any suitable node in a switching power supply, thereby reducing the radiated EMI of the power supply.

As discussed above, the matching capacitor may be a single capacitor, multiple capacitors connected in series, multiple capacitors connected in parallel, or multiple capacitors connected in series and parallel. Different matching capacitors may have the same or different capacitance values. The present disclosure can reduce an amplitude of EMI in a targeted manner by changing the capacitance of the matching capacitor to adjust the high-frequency equivalent impedance of the ferrite bead. In some embodiments, the matching capacitor can have N×M combinations. In various embodiments, the magnetic bead may be a single magnetic bead, multiple magnetic beads connected in series, multiple magnetic beads connected in parallel, multiple magnetic beads connected in series and parallel. Different magnetic beads may be the same or different impedance characteristics. In the present disclosure, the magnetic bead can have N×M combinations.

Figure 5:
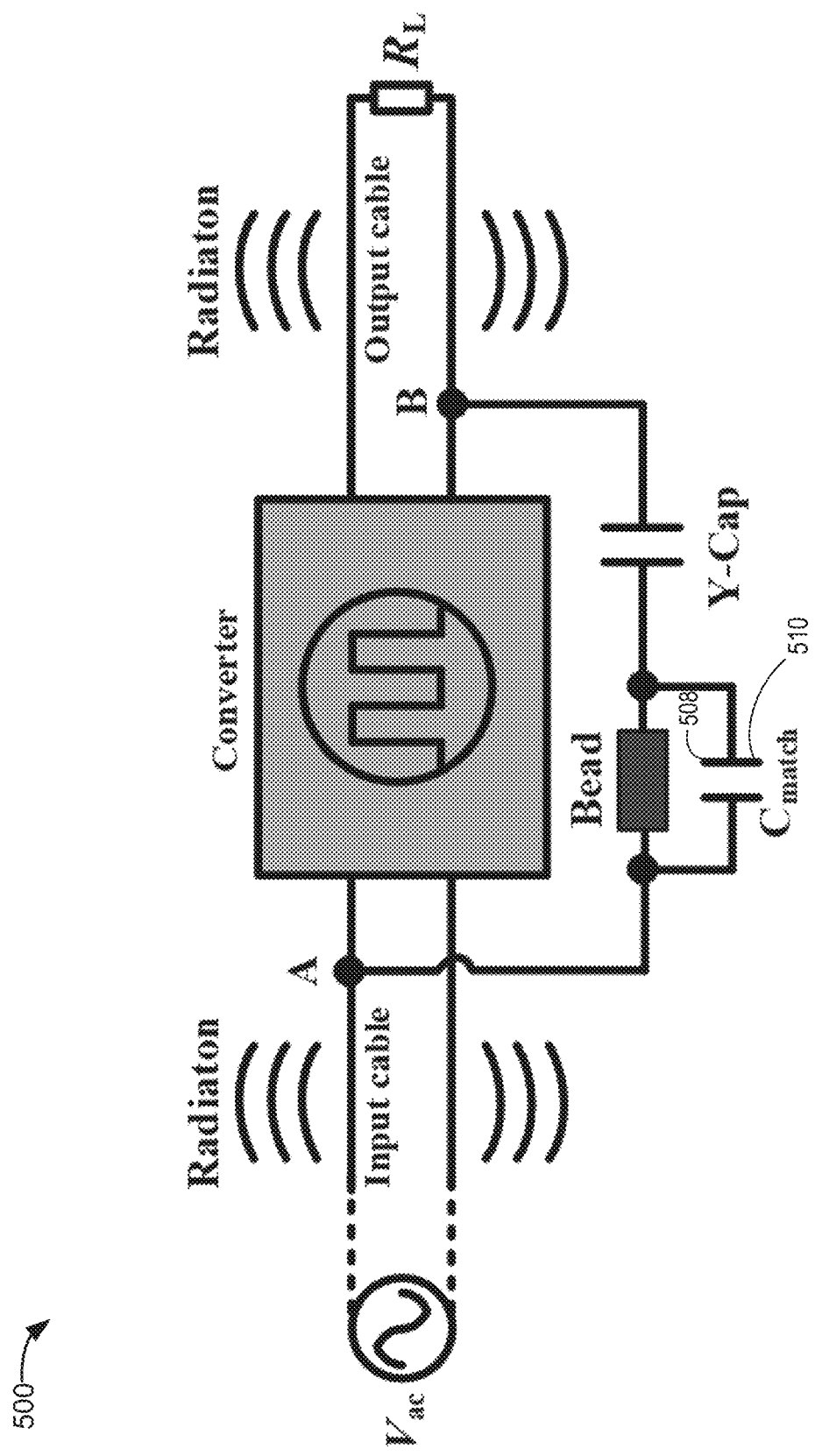
FIG. 5 illustrates a power converter 500 that is similar to the power converter of FIG. 1A except that a Y-capacitor is connected to the point B, according to an embodiment of the disclosure.

FIG. 5 illustrates a power converter 500 that is similar to the power converter 100 except that a Y-capacitor is connected to the point B, according to an embodiment of the disclosure. In the power converter 500, the Y-capacitor can be connected between point B and the ferrite bead 508. A matching capacitor 510 can be connected in parallel with the ferrite bead 508. The matching capacitor 510 can be arranged to customize the EMI suppression frequencies of the ferrite bead 508. In this way, a reduction of radiated EMI can be achieved at desired frequencies and the power converter 500 is enabled to operate within acceptable EMI limits.

Figure 6:
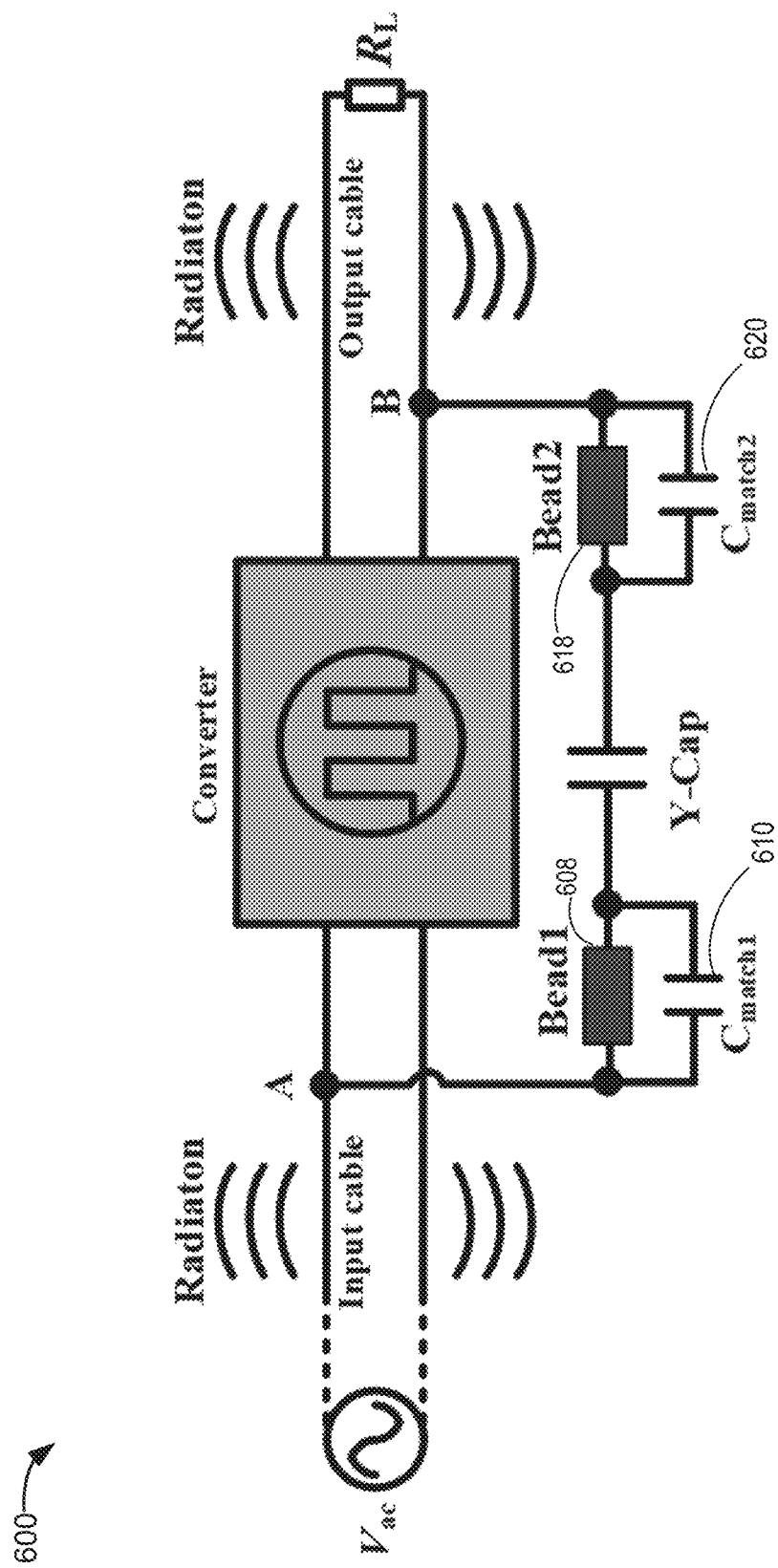
FIG. 6 illustrates a power converter 600 that is similar to the power converter of FIG. 1A except two ferrite beads and matching capacitors are used, according to an embodiment of the disclosure.

FIG. 6 illustrates a power converter 600 that is similar to the power converter 100 except two ferrite beads and matching capacitors are used, according to an embodiment of the disclosure. In the power converter 600, a first ferrite bead 608 can be connected to node A, while a second ferrite bead 618 can be connected to node B. A Y-capacitor can be connected between the first ferrite bead 608 and the second ferrite bead 618. A first matching capacitor 610 can be connected in parallel with the first ferrite bead 608, while a second matching capacitor 620 can be connected in parallel with the second ferrite bead 618. The combination of the first and second ferrite beads and their respective matching capacitors can be arranged to fine tune the EMI suppression frequencies of the network, thereby achieving radiated EMI at desired frequencies that is within acceptable EMI limits. The primary connection point A and the secondary connection point B can be changed to any arbitrary positions of primary and secondary circuits, respectively. The Y-capacitor may be a single Y-capacitor or multiple Y-capacitors connected in series.

Figure 7A:
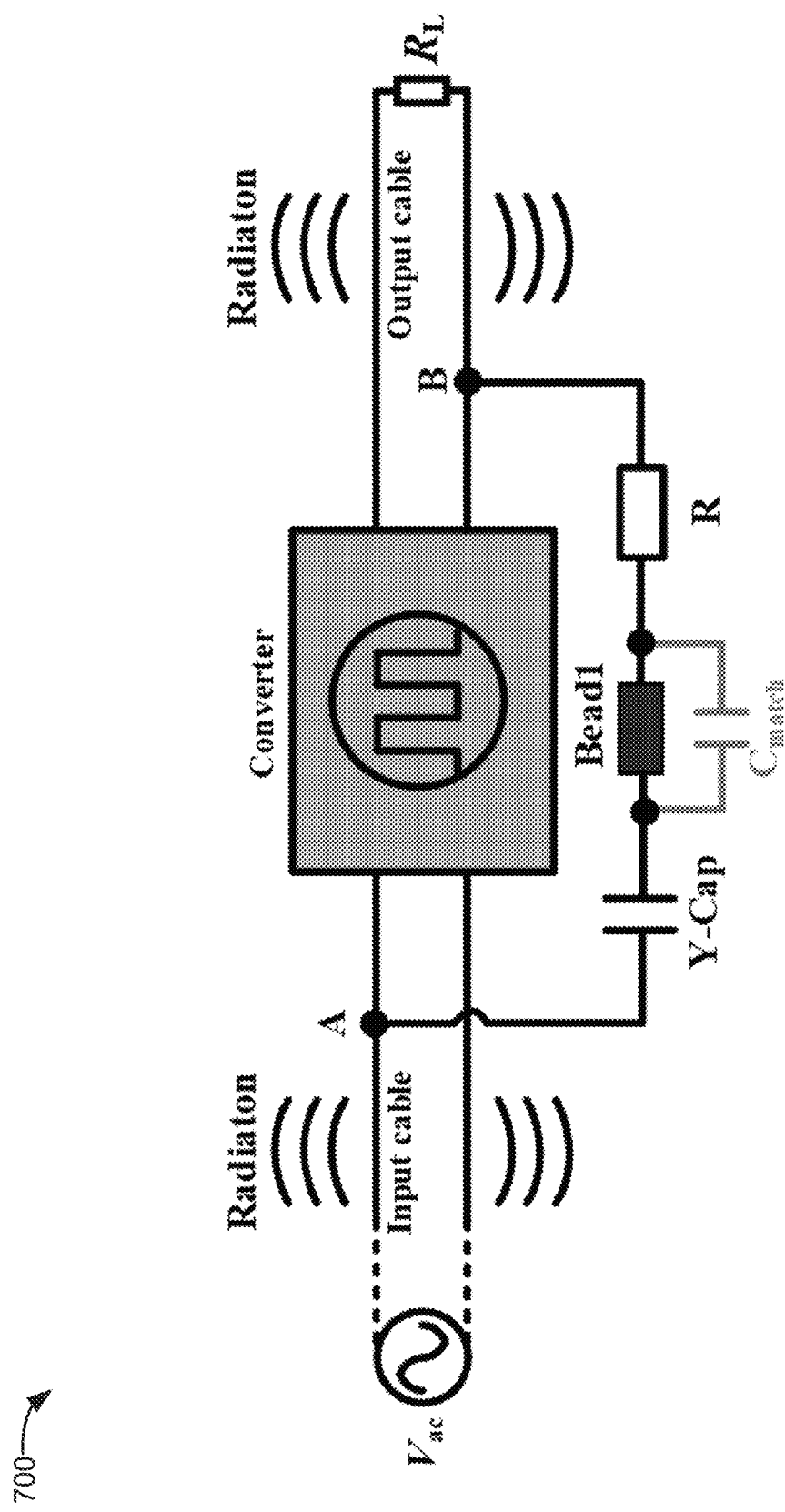
FIG. 7A and FIG. 7B illustrate power converters and that are similar to the power converter of FIG. 1A except that a resistor may connected in series or in parallel with the ferrite bead, according to embodiments of the disclosure.
Figure 7B:
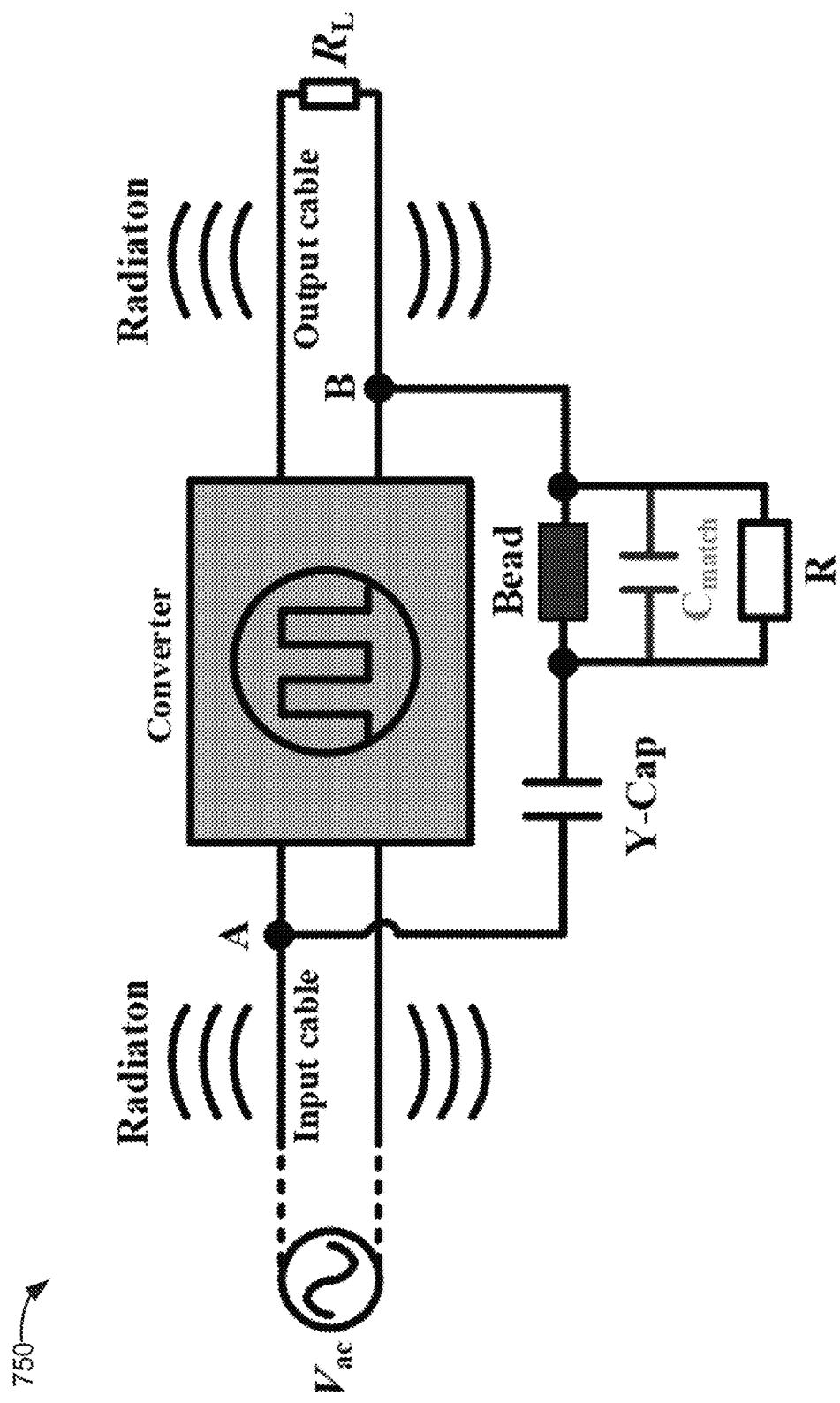

FIG. 7A and FIG. 7B illustrate power converters 700 and 750 that are similar to the power converter 100 except that a resistor may connected in series or in parallel with the ferrite bead, according to embodiments of the disclosure. In some applications, the ferrite bead may be connected in series or in parallel with a resistor to further limit the propagation of radiated EMI. In power converter 700 the ferrite bead can be connected in series with the resistor R, and in power converter 750, the ferrite bead can be connected in parallel with the resistor R. In some embodiments, the ferrite bead may be connected in parallel with the matching capacitor $C_{match}$, while in alternate embodiments the ferrite bead may not be connected in parallel with the matching capacitor $C_{match}$.

Figure 8A:
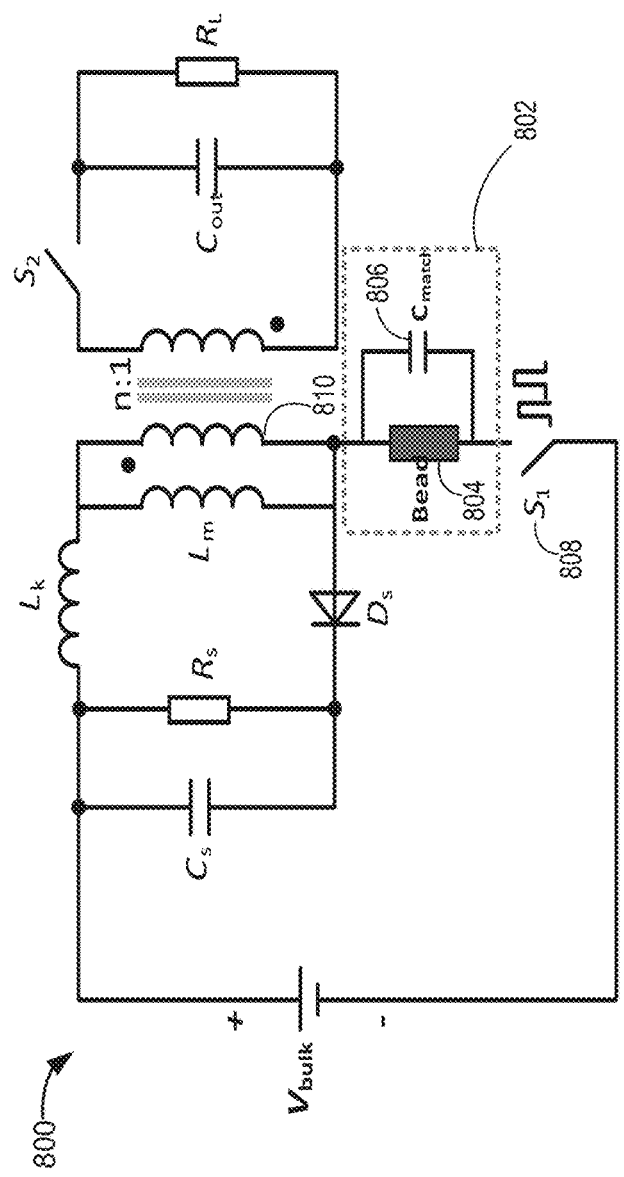
FIG. 8A illustrates a flyback power converter utilizing the disclosed methods to reduce the radiated EMI, according to embodiments of the disclosure.

FIG. 8A illustrates a flyback power converter utilizing the disclosed methods to reduce the radiated EMI, according to embodiments of the disclosure. In FIG. 8A, a flyback power converter 800 is shown with a radiated EMI reduction network 802. The radiated EMI reduction network 802 can include a ferrite bead 804 and a matching capacitor 806 that is connected in parallel with the ferrite bead 804. The radiated EMI reduction network 802 can be connected between a drain terminal of a switch 808 and primary side winding 810. The radiated EMI reduction network 802 is arranged to reduce the radiated EMI of the flyback power converter 800. In some embodiments, a value of the matching capacitor 806 can be, for example, 20 pF. The matching capacitor 806 can be arranged to fine tune the high-frequency characteristics of the ferrite bead 804 such that the radiated EMI of the flyback power converter is reduced to acceptable EMI limits.

Figure 8B:
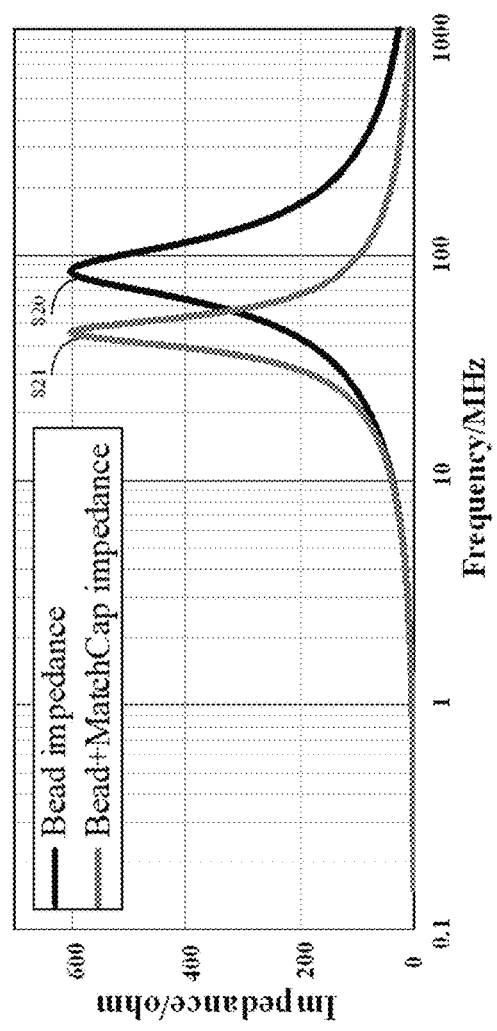
FIG. 8B shows impedance as a function of frequency for a ferrite bead and a matching capacitor in combination with a ferrite bead used in the flyback power converter of FIG. 8A, according to certain embodiments.

FIG. 8B shows impedance as a function of frequency for a ferrite bead and a matching capacitor in combination with a ferrite bead used in the flyback power converter 800 of FIG. 8A, according to certain embodiments. Graph 820 shows the impedance as a function of frequency for the ferrite bead 804 without any modifications. Graph 821 shows impedance as a function of frequency for the combination of the ferrite bead 804 and the matching capacitor 806 when the matching capacitor 806 is connected in parallel with the ferrite bead 804. As shown in graph 820, a resonant frequency of the combination of the ferrite bead 804 and the matching capacitor 806 is reduced as compared to the resonant frequency of the ferrite bead 804 alone. In this way, a customized impedance as a function of frequency can be generated that can reduce the radiated EMI in the power converter.

Figures 8C, 8D:
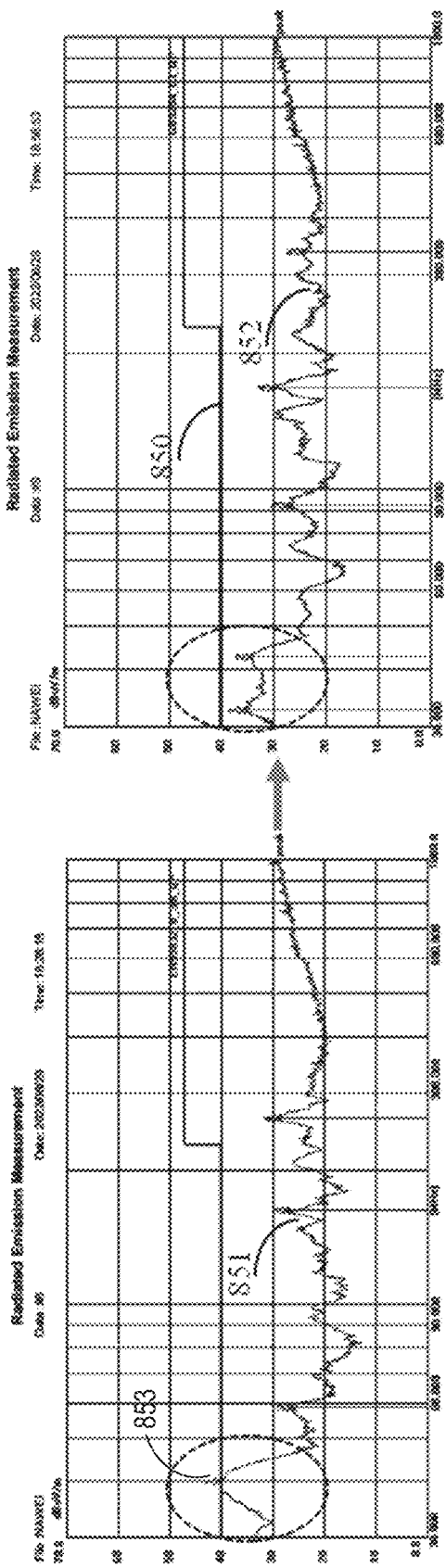

FIG. 8C shows radiated EMI spectrum for the flyback power converter 800 without utilizing the disclosed methods, while FIG. 8D shows radiated EMI spectrum for the flyback power converter 800 using the disclosed methods to reduce radiated EMI of the converter. The test results show frequency range of 30 MHz to 1 GHz. Graph 851 shows the radiated EMI test results without utilizing the disclosed methods. As shown in graph 851, the radiated EMI may exceed the acceptable limits at frequency point 853. Graph 852 shows the radiated EMI test results utilizing the disclosed methods while the acceptable limits is shown in graph 850. As shown, by coupling a matching capacitor of proper value in parallel with the ferrite bead 804, the radiated EMI of the flyback power converter 800 can be reduced (at 32 MHz (1) and 42 MHz (2)) to be within the acceptable limits, thereby enabling the flyback power converter 800 to operate within the acceptable EMI limits.

Figure 9A:
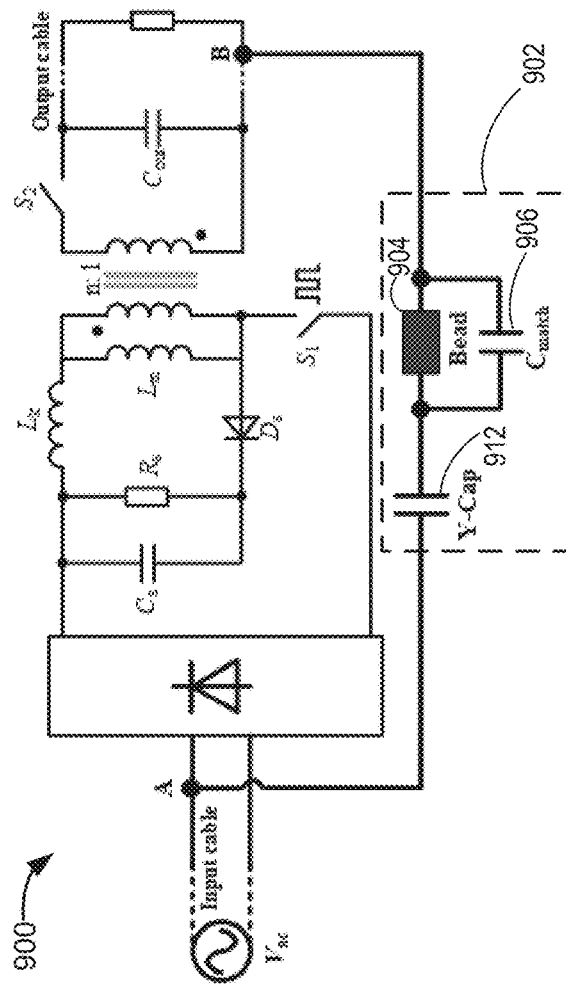
FIG. 9A illustrates a flyback power converter utilizing the disclosed methods to reduce the radiated EMI, according to embodiments of the disclosure.

FIG. 9A illustrates a flyback power converter utilizing the disclosed methods to reduce the radiated EMI by coupling a matching capacitor in parallel with a ferrite bead that is connected in series with a Y-capacitor, according to an embodiment of the disclosure. In FIG. 9A, a flyback power converter 900 is shown with a radiated EMI reduction network 902. The radiated EMI reduction network 902 can include a ferrite bead 904 and a matching capacitor 906 that is connected in parallel with the ferrite bead 904. The radiated EMI reduction network 902 can further include a Y-capacitor 912 connected in series to the ferrite bead 904. The radiated EMI reduction network 902 can be connected between the primary side point A and second side point B. The radiated EMI reduction network 902 is arranged to reduce the radiated EMI of the flyback power converter 900. In some embodiments, a value of the matching capacitor 906 can be, for example, 1 nF. The input and output lines of the flyback power converter 900 may form an antenna and radiate EMI. The matching capacitor 906 can be arranged to fine tune the high-frequency characteristics of the ferrite bead 904 such that the radiated EMI of the flyback power converter is reduced to acceptable EMI limits. Further, the Y-capacitor connected in series with the ferrite bead can reduce the noise source current flowing to the input and output lines.

Figure 9B:
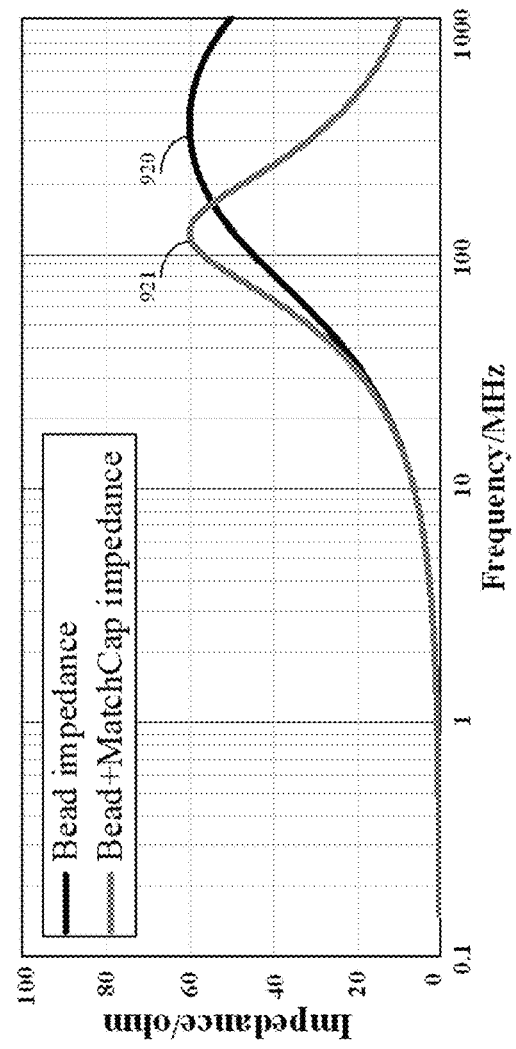
FIG. 9B shows impedance as a function of frequency for a ferrite bead and a matching capacitor in combination with a ferrite bead used in the flyback power converter of FIG. 9A, according to certain embodiments.

FIG. 9B shows impedance as a function of frequency for a ferrite bead and a matching capacitor in combination with a ferrite bead used in the flyback power converter of FIG. 9A, according to certain embodiments. Graph 920 shows the impedance as a function of frequency for the ferrite bead 904 without any modifications. Graph 921 shows impedance as a function of frequency for the combination of the ferrite bead 904 and the matching capacitor 906 when the matching capacitor 906 is connected in parallel with the ferrite bead 904. As shown in graph 920, a resonant frequency of the combination of the ferrite bead 904 and the matching capacitor 906 is reduced as compared to the resonant frequency of the ferrite bead 904 alone. In this way, a customized impedance as a function of frequency can be generated that can reduce the radiated EMI in the power converter.

Figures 9C, 9D:
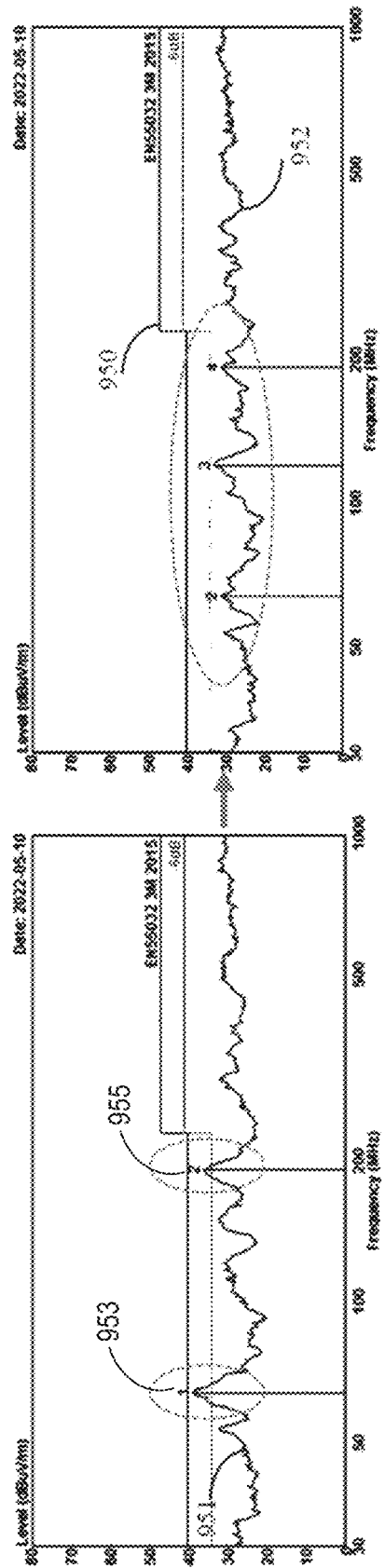

FIG. 9C shows radiated EMI spectrum for the flyback power converter 800 without utilizing the disclosed methods, while FIG. 9D shows radiated EMI spectrum for the flyback power converter 900 using the disclosed methods to reduce radiated EMI of the converter. The test results show frequency range of 30 MHz to 1 GHz. Graph 951 shows the radiated EMI test results without utilizing the disclosed methods. As shown in graph 951, the radiated EMI may exceed the acceptable limits at frequency point 953 and 955. Graph 852 shows the radiated EMI test results utilizing the disclosed methods while the acceptable limits is shown in graph 950. As shown, by coupling a matching capacitor of proper value in parallel with the ferrite bead 904, the radiated EMI of the flyback power converter 900 can be reduced (from 60 MHz to 200 MHz) to be within the acceptable limits, thereby enabling the flyback power converter 900 to operate within the acceptable EMI limits.

Figure 10:
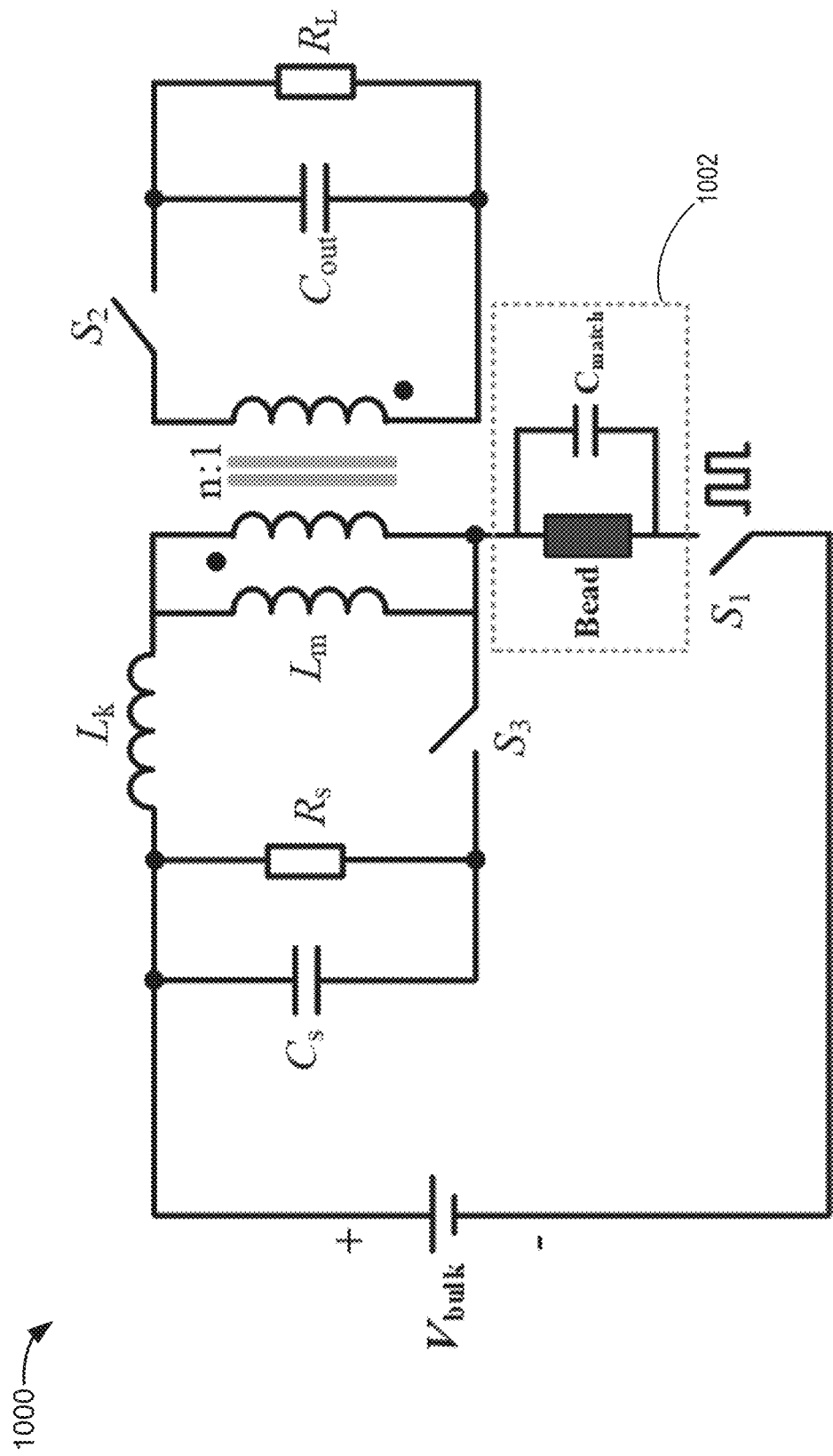
FIG. 10 illustrates an active clamp flyback power converter utilizing the disclosed methods to reduce the radiated EMI, according to embodiments of the disclosure.

FIG. 10 illustrates an active clamp flyback power converter utilizing the disclosed methods to reduce the radiated EMI, according to embodiments of the disclosure. The active clamp flyback power converter 1000 can include a radiated EMI reduction network 1002 that can reduce the radiated EMI.

Figure 11:
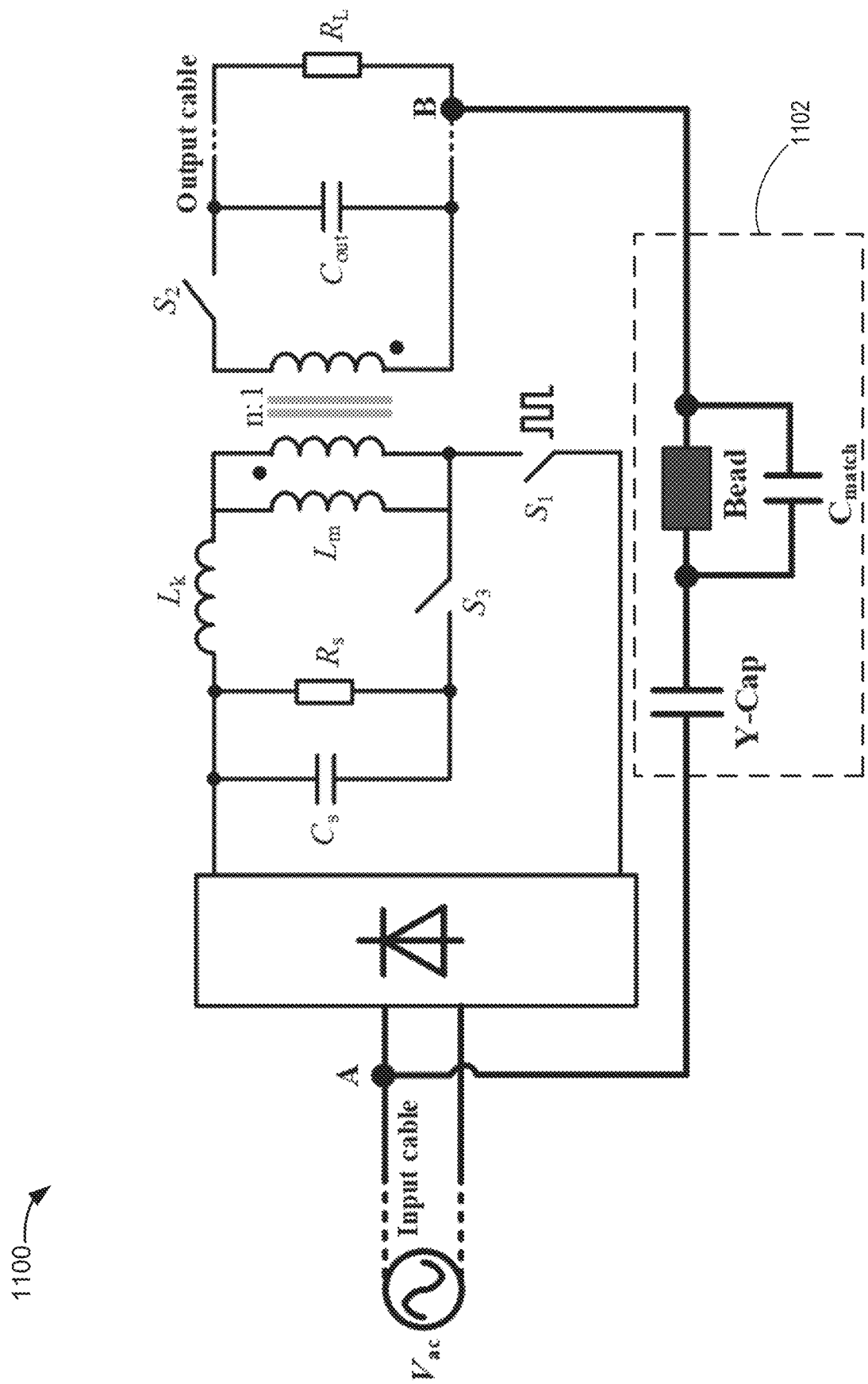
FIG. 11 illustrates an active clamp flyback power converter with a Y-capacitor added, according to embodiments of the disclosure.

FIG. 11 illustrates an active clamp flyback power converter with a Y-capacitor added, according to embodiments of the disclosure. The active clamp flyback power converter 1100 can include a radiated EMI reduction network 1102 that can reduce the radiated EMI.

Figure 12:
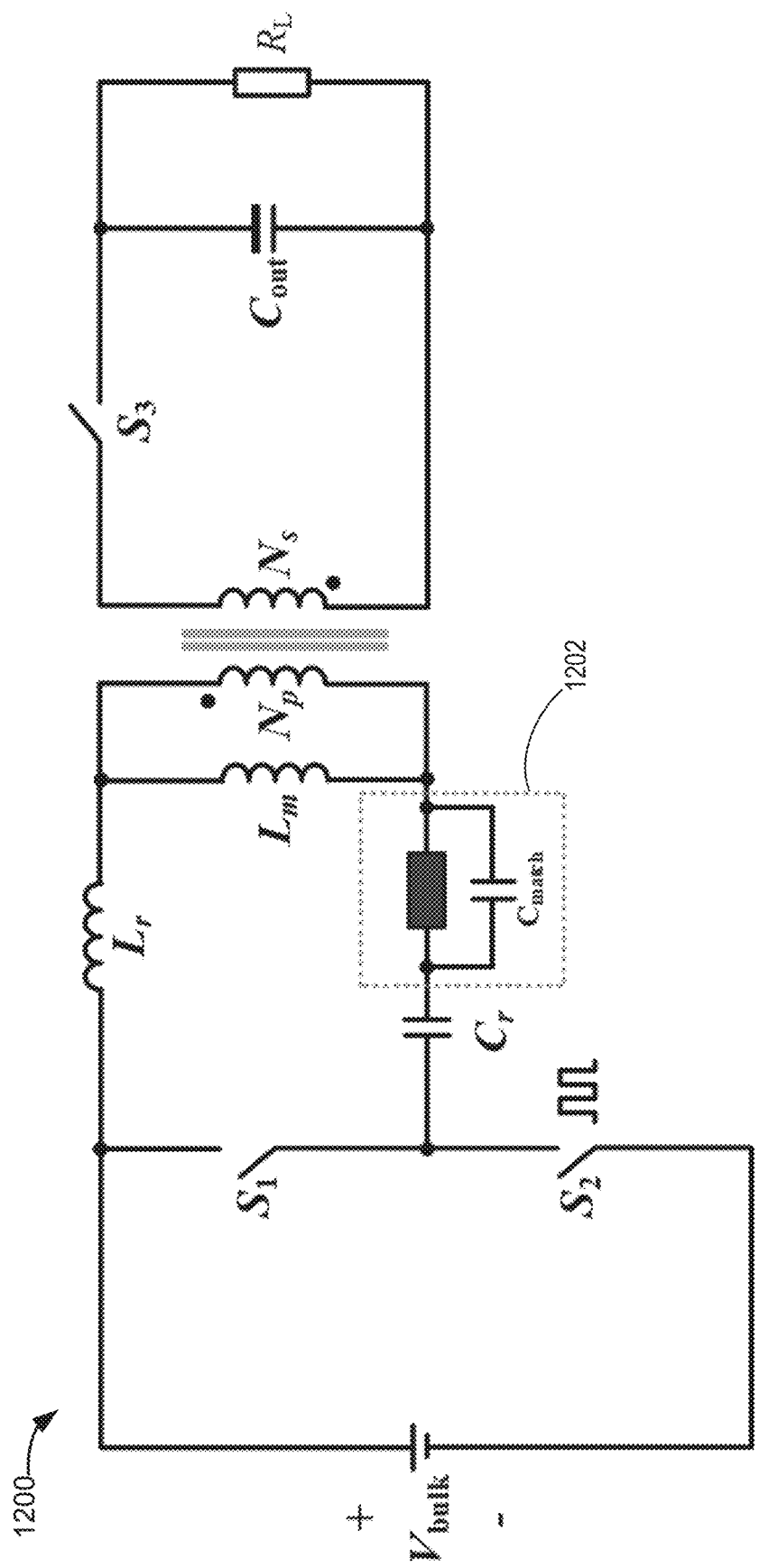
FIG. 12 illustrates an asymmetric half-bridge flyback converter with a radiated EMI reduction network, according to embodiments of the disclosure.

FIG. 12 illustrates an asymmetric half-bridge flyback converter with a radiated EMI reduction network, according to embodiments of the disclosure. The asymmetric half-bridge flyback converter 1200 can include a radiated EMI reduction network 1202 that can reduce the radiated EMI.

Figure 13:
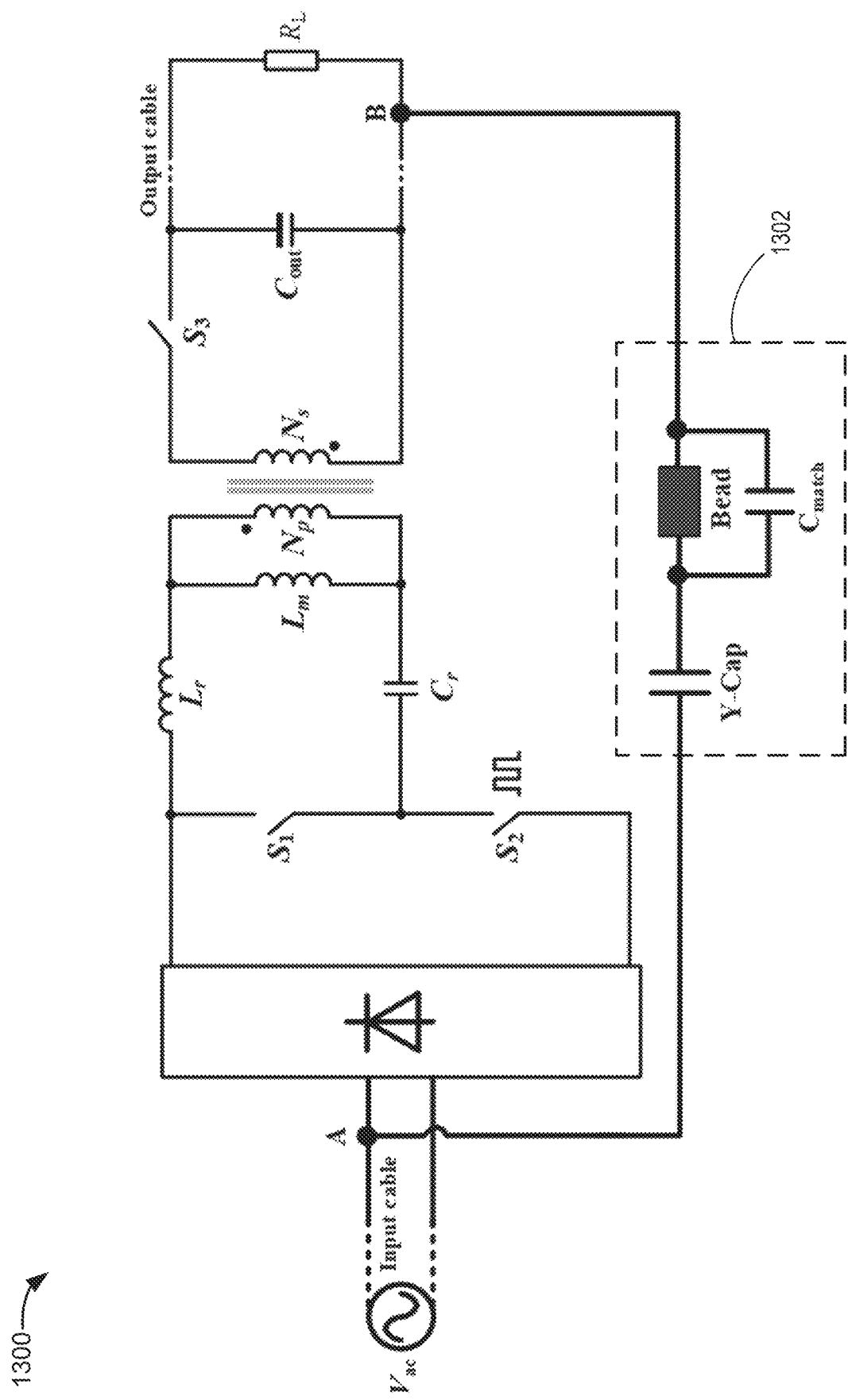
FIG. 13 illustrates an asymmetric half-bridge flyback converter with a Y-capacitor added to the radiated EMI reduction network, according to embodiments of the disclosure.

FIG. 13 illustrates an asymmetric half-bridge flyback converter with a Y-capacitor added to the radiated EMI reduction network, according to embodiments of the disclosure. The asymmetric half-bridge flyback converter 1300 can include a radiated EMI reduction network 1302 that can reduce the radiated EMI.

Figure 14B:
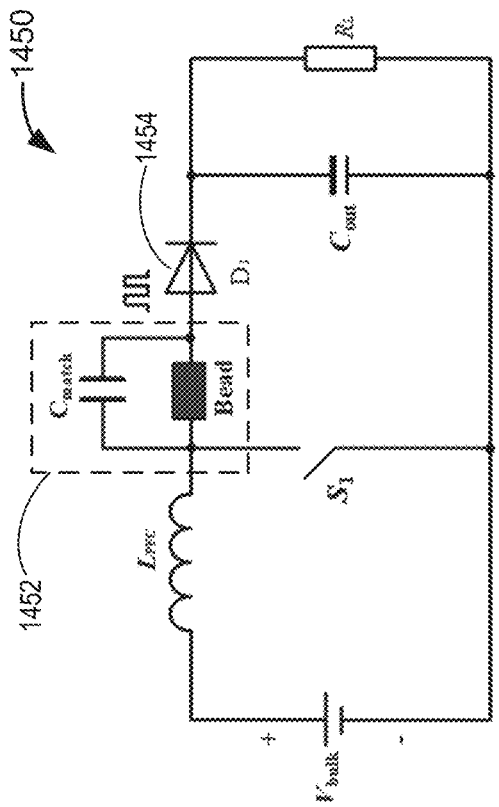
FIG. 14B illustrates a PFC converter with a radiated EMI reduction network connected in series with a freewheeling diode, according to embodiments of the disclosure.
Figure 14A:
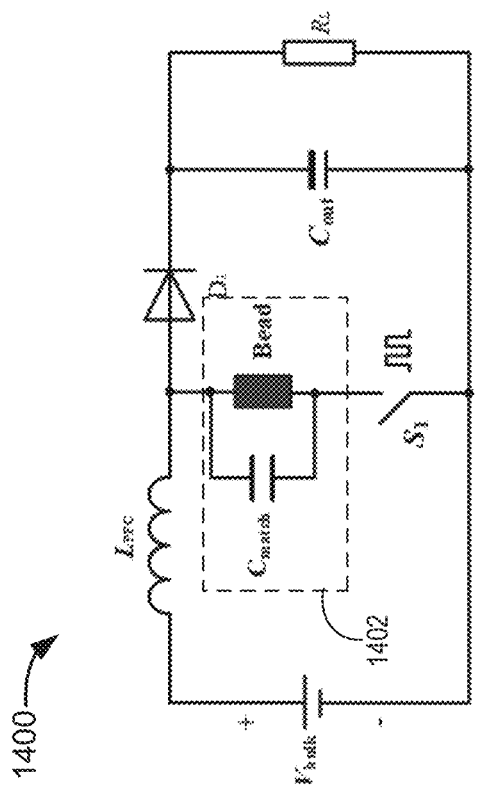
FIG. 14A illustrates a power factor correction (PFC) converter with a radiated EMI reduction network, according to embodiments of the disclosure.

FIG. 14A illustrates a power factor correction (PFC) converter with a radiated EMI reduction network, according to embodiments of the disclosure. The PFC converter 1400 can include a radiated EMI reduction network 1402 that is connected in series with a switch and that can reduce the radiated EMI.

FIG. 14B illustrates PFC converter with a radiated EMI reduction network connected in series with a freewheeling diode, according to embodiments of the disclosure. The PFC converter 1450 can include a radiated EMI reduction network 1452 that is connected in series with a freewheeling diode 1454, where the radiated EMI reduction network 1452 can reduce the radiated EMI.

Figure 15A:
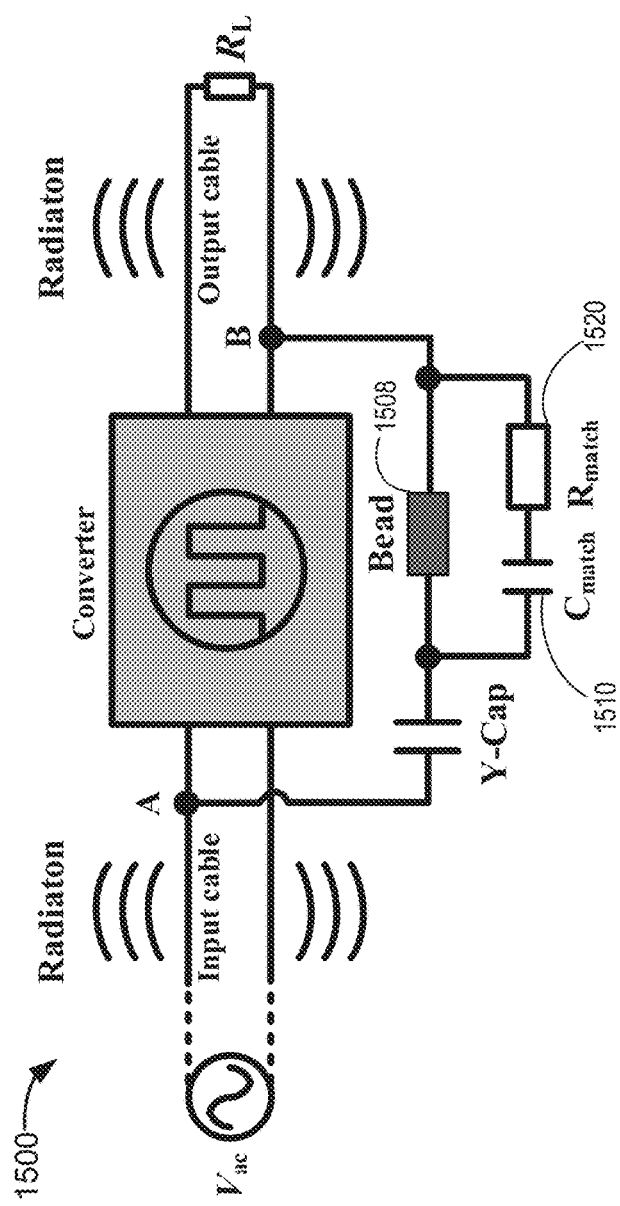
FIG. 15A illustrates a power converter 1500 with a matching capacitor and resistor connected in parallel to a ferrite bead according to an embodiment of the disclosure.

FIG. 15A illustrates a power converter 1500 with a matching capacitor and resistor connected in parallel to a ferrite bead according to an embodiment of the disclosure. The power converter 1500 is similar to the power converter 100 of FIG. 1A, except that an impedance network that includes a matching resistor 1520 serially connected to a matching capacitor 1510 is coupled in parallel to a ferrite bead 1508. The addition of the matching resistor 1520 can further improve the radiated EMI characteristics of the power converter 1500. As is described further below, the resistor 1520 may be a network of serially or parallel connected resistors.

Figure 15B:
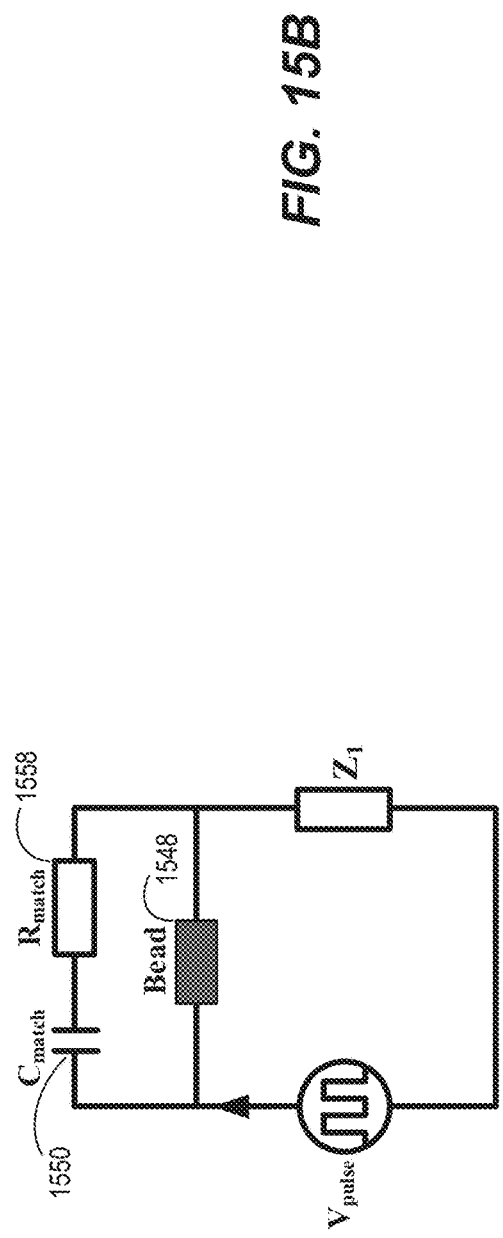
FIG. 15B illustrates a converter circuit with a ferrite bead and its matching capacitor that is connected in series with a resistor coupled with a switching device, according to certain embodiments.

FIG. 15B illustrates a converter circuit with a ferrite bead and its matching capacitor that is connected in series with a resistor coupled with a switching device, according to certain embodiments. Matching capacitor 1550 can be connected in series with a matching resistor 1558, that are coupled in parallel with the ferrite bead 1548. The addition of the matching resistor 1558 can improve the radiated EMI characteristics of the ferrite bead 148. $V_{pulse}$ is an equivalent noise source of a potential jump point and $Z_1$ is an equivalent impedance of the radiated EMI propagation path.

Figures 15C, 15D, 15E:
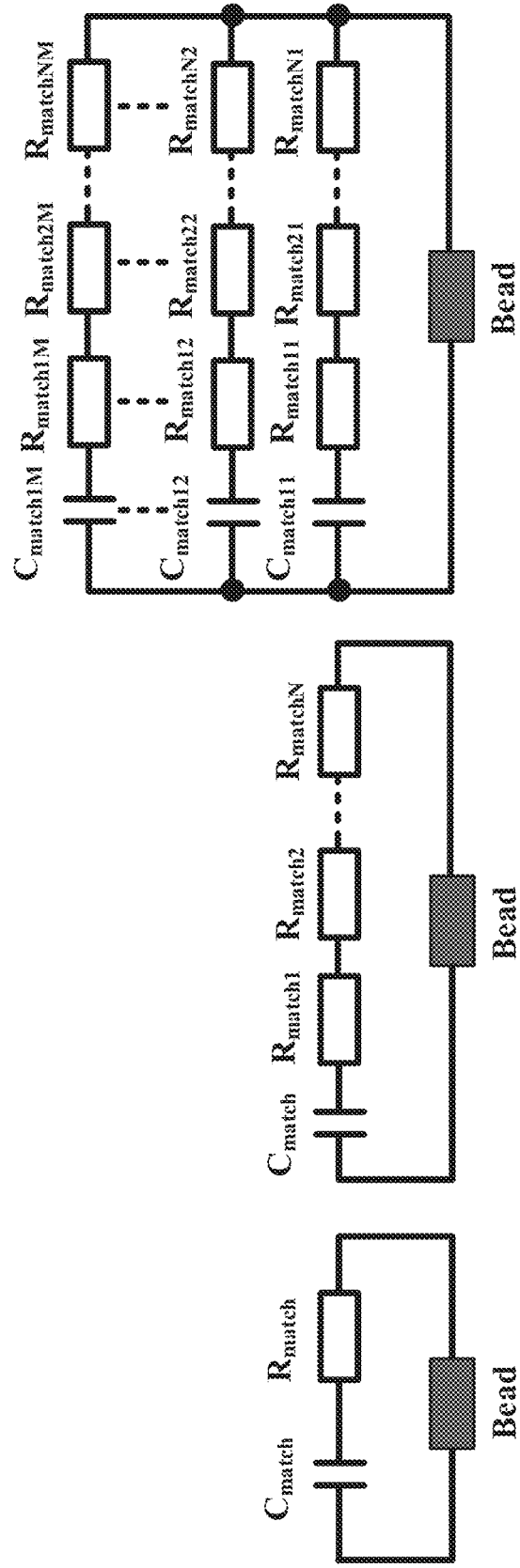
FIGS. 15C-15E illustrate various configurations for connecting a matching resistor to a matching capacitor or a plurality of capacitors to a ferrite bead in a power converter according to embodiments of the disclosure.

FIGS. 15C-15E illustrate various configurations for connecting a matching resistor to a matching capacitor or a plurality of capacitors to a ferrite bead in a power converter according to embodiments of the disclosure. FIG. 15C shows a single matching resistor coupled to a matching capacitor connected in parallel with a ferrite bead. FIG. 15D shows a plurality of matching resistor connected serially to a matching capacitor, where the plurality of matching resistors and the matching capacitor is connected in parallel with a ferrite bead. FIG. 15E shows a plurality of matching resistor connected to a plurality of matching capacitors that are coupled in parallel to the ferrite bead. The various configurations in FIGS. 15C-15E enable fine tuning of the EMI suppression frequencies of the ferrite bead.

As appreciated by one of ordinary skill in the art having the benefit of this disclosure, FIG. 1A can illustrate an application mode for the converters of FIG. 5, FIG. 6, FIG. 7A, FIG. 7B, FIG. 9A, FIG. 11 and FIG. 13, and FIG. 1B can illustrate an application mode for the converters of FIG. 8A, FIG. 10, FIG. 12, FIG. 14A and FIG. 14B.

In some embodiments, combination of the circuits and methods disclosed herein can be utilized to improve radiated EMI in power converters, and to reduce the effects of oscillations, ringing and voltage spikes on internal nodes of a power converter. Although circuits and methods are described and illustrated herein with respect to several particular configuration of a power converter, embodiments of the disclosure are suitable for improving radiated EMI in other power converters, such as, but not limited to, push-pull converters.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A converter circuit comprising:
   a transformer having a primary winding and a secondary winding, the primary winding extending from a first primary terminal to a second primary terminal;
   a switch having a first gate terminal, a first source terminal and a first drain terminal, wherein the first drain terminal is coupled to the first primary terminal, and the first source terminal is coupled to a power source;
   a capacitor having a first capacitor terminal and second capacitor terminal, wherein the first capacitor terminal is coupled to the power source, wherein the first capacitor terminal is directly coupled to the second primary terminal;
   a ferrite bead having a first ferrite bead terminal and a second ferrite bead terminal, wherein the first ferrite bead terminal is directly coupled to the first primary terminal and the second ferrite bead terminal is directly coupled to the first drain terminal; and
   a capacitor network coupled in parallel with the ferrite bead and arranged to reduce radiated electromagnetic interference of the converter circuit.

2. The converter circuit of claim 1, further comprising a diode having a first diode terminal and a second diode terminal, wherein the first diode terminal is coupled to the first primary terminal and the second diode terminal is coupled to the second capacitor terminal.

3. The converter circuit of claim 1, wherein the capacitor network comprises a plurality of serially connected capacitors.

4. The converter circuit of claim 1, wherein the capacitor network comprises a plurality of parallel connected capacitors.

5. The converter circuit of claim 1, wherein the ferrite bead comprises a plurality of serially connected ferrite beads.

6. The converter circuit of claim 1, further comprising a resistor network coupled in series with the capacitor network.

7. The converter circuit of claim 1, wherein the switch is a gallium nitride (GaN) based switch.

8. A method of reducing radiated electromagnetic interference in a converter circuit, the method comprising:
   providing a transformer having a primary winding and a secondary winding, the primary winding extending from a first primary terminal to a second primary terminal;
   providing a switch having a first gate terminal, a first source terminal and a first drain terminal, wherein the first drain terminal is coupled to the first primary terminal, and the first source terminal is coupled to a power source;
   providing a capacitor having a first capacitor terminal and second capacitor terminal, wherein the first capacitor terminal is coupled to the power source, wherein the first capacitor terminal is directly coupled to the second primary terminal;
   providing a ferrite bead having a first ferrite bead terminal and a second ferrite bead terminal;
   coupling the first ferrite bead terminal directly to the first primary terminal and the second ferrite bead terminal directly to the first drain terminal; and
   coupling a capacitor network coupled in parallel with the ferrite bead and arranged to reduce a radiated electromagnetic interference of the converter circuit.

9. The method of claim 8, further comprising providing a diode having a first diode terminal and a second diode terminal, wherein the first diode terminal is coupled to the first primary terminal and the second diode terminal is coupled to the second capacitor terminal.

10. The method of claim 8, wherein the capacitor network comprises a plurality of serially connected capacitors.

11. The method of claim 8, wherein the capacitor network comprises a plurality of parallel connected capacitors.

12. The method of claim 8, wherein the ferrite bead comprises a plurality of serially connected ferrite beads.

13. A converter circuit comprising:
    a transformer having a primary winding and a secondary winding, the primary winding extending from a first primary terminal to a second primary terminal;
    a switch having a first gate terminal, a first source terminal and a first drain terminal, wherein the first drain terminal is coupled to the first primary terminal, and the first source terminal is coupled to a power source;
    a capacitor having a first capacitor terminal and second capacitor terminal, wherein the first capacitor terminal is coupled to the power source;
    a diode having a first diode terminal and a second diode terminal, wherein the first diode terminal is coupled to the first primary terminal and the second diode terminal is coupled to the second capacitor terminal;
    a ferrite bead coupled between the power source and the secondary winding;
    a Y-capacitor coupled between the ferrite bead and the power source; and
    a capacitor network coupled in parallel with the ferrite bead and arranged to reduce radiated electromagnetic interference of the converter circuit.

14. The converter circuit of claim 13, wherein the capacitor network comprises a plurality of serially connected capacitors.

15. The converter circuit of claim 13, wherein the capacitor network comprises a plurality of parallel connected capacitors.

16. The converter circuit of claim 13, wherein the ferrite bead comprises a plurality of serially connected ferrite beads.

17. The converter circuit of claim 13, wherein the ferrite bead comprises a plurality of parallel connected ferrite beads.

18. The converter circuit of claim 13, further comprising a resistor network coupled in series with the capacitor network.

19. The converter circuit of claim 16, further comprising a resistor network coupled in series with the capacitor network.

20. The converter circuit of claim 13, wherein the switch is a gallium nitride (GaN) based switch.

* * * * *